United States Patent
Disraeli et al.

(10) Patent No.: US 9,392,456 B2
(45) Date of Patent: Jul. 12, 2016

(54) CALL CENTER SMS VERIFICATION SYSTEM AND METHOD

(71) Applicant: TeleSign Corporation, Marina del Rey, CA (US)

(72) Inventors: Ryan Disraeli, Los Angeles, CA (US); Paul Stovall, Los Angeles, CA (US)

(73) Assignee: TeleSign Corporation, Marina del Rey, CA (US)

( * ) Notice: Subject to any disclaimer, the term of this patent is extended or adjusted under 35 U.S.C. 154(b) by 0 days.

(21) Appl. No.: 14/035,773

(22) Filed: Sep. 24, 2013

(65) Prior Publication Data

US 2015/0087265 A1 Mar. 26, 2015

(51) Int. Cl.
*H04M 1/66* (2006.01)
*H04W 12/06* (2009.01)
*H04L 29/06* (2006.01)
*H04W 12/08* (2009.01)
*H04W 4/14* (2009.01)

(52) U.S. Cl.
CPC ............... *H04W 12/06* (2013.01); *H04L 63/18* (2013.01); *H04W 4/14* (2013.01); *H04W 12/08* (2013.01)

(58) Field of Classification Search
CPC ..... H04W 12/04; H04W 12/06; H04W 12/08; H04W 16/00; H04W 12/00; H04W 12/02; H04W 48/02; H04W 4/14; H04W 4/20; H04W 60/00; H04W 8/265
USPC ................ 455/410, 411, 414.1, 432.3, 435.1, 455/435.2, 435.3
See application file for complete search history.

(56) References Cited

U.S. PATENT DOCUMENTS

| 5,146,215 | A | * | 9/1992 | Drori | ........................... 340/5.22 |
|---|---|---|---|---|---|
| 7,945,034 | B2 | | 5/2011 | Gonen et al. | |
| 8,117,106 | B2 | | 2/2012 | Gonen et al. | |
| 8,462,920 | B2 | | 6/2013 | Gonen et al. | |
| 8,687,038 | B2 | | 4/2014 | Gonen et al. | |
| 8,856,956 | B2 | * | 10/2014 | Stibel et al. | ..................... 726/28 |
| 8,973,109 | B2 | | 3/2015 | Jillings | |
| 9,049,286 | B2 | | 6/2015 | Gonen et al. | |
| 2003/0105725 | A1 | * | 6/2003 | Hoffman | ................. G06F 21/32 705/75 |
| 2010/0131409 | A1 | * | 5/2010 | Lawyer et al. | ................... 705/44 |
| 2010/0145727 | A1 | * | 6/2010 | Toussaint | ............... G06Q 10/00 705/3 |
| 2013/0117862 | A1 | * | 5/2013 | Farrell et al. | .................... 726/29 |
| 2014/0015971 | A1 | * | 1/2014 | Dejuliis | ........................ 348/148 |
| 2014/0058938 | A1 | * | 2/2014 | McClung, III | ....... G06Q 20/227 705/41 |
| 2014/0199965 | A1 | * | 7/2014 | Cepuran et al. | ............... 455/411 |

OTHER PUBLICATIONS

U.S. Appl. No. 14/207,411, filed Jul. 10, 2014, Gonen et al.

* cited by examiner

*Primary Examiner* — Jean Gelin
(74) *Attorney, Agent, or Firm* — Philip Lee

(57) ABSTRACT

A service call between a service user and a call center for a service provider is established when the service user is contacted or calls into the call center of the service provider. The service provider may request basic account information for verification of the identity of the service user. If the service provider determines that a further verification of the user's identity is necessary, the service provider may send a verification code to the service user via the user communication device. The verification code is relayed back to the service provider. The transmitted verification code and the relayed verification code are compared and if the codes match, the user is authenticated.

27 Claims, 6 Drawing Sheets

CALL CENTER SMS VERIFICATION SYSTEM AND METHOD

FIELD OF THE INVENTION

The present invention relates generally to verification of the identity of a user of a service and, more particularly, the verification of a user of a service during an ongoing service call with the user and a representative of a service provider.

BACKGROUND OF THE INVENTION

Many service providers establish call centers as a central point of customer contact and interaction. Typically, call centers have live operators to answer calls for customer support, product support, information inquiries, and the like. Also, service providers often need to contact service users for a variety of reasons including transaction verification, marketing, billing issues, and the like. Due to the risk of client loss when service users become frustrated with a service provider's call center management, most call centers tend to focus on having high levels of agent productivity and customer experience rather than fraud prevention.

Call centers often rely on knowledge-based authentication (KBA) to authenticate users before allowing callers to discuss their sensitive account details and execute transactions. KBA is a method of authentication based on the nonpublic knowledge of the service user, usually though security or life history questions. Unfortunately, KBA is problematic due to the lack of standards for which information may be kept confidential among different service providers, as well as the ability of fraudulent users to obtain information that may be publicly accessible despite a service provider using it as a knowledge-based authenticator. In addition, KBA is prone to circumvention because fraudulent users can use both publicly accessible and/or stolen information to correctly respond to questions. Furthermore, legitimate users sometimes fail to answer the questions correctly, often leading to customer frustration and inconvenience.

Moreover, KBA largely depend on call center agents and other service representatives to screen out fraudulent users among numerous callers. However, service agents and representatives are generally not focused on fraud, but rather on providing efficient customer service as quickly as possible. Service agents and representatives can be socially engineered (i.e., manipulated into performing actions or divulging confidential information), and often represent the weakest link in security. For example, fraudsters often pose as people who need to access the account of a spouse or partner due to exigent circumstances. By using social engineering tricks and insisting on the gravity of their supposed situation, fraudster have been known to persuade service representatives to access customer accounts and reveal nonpublic personal information.

Call centers also rely on automatic number identification (ANI) as an alternative to KBA. Similar to caller identification (caller ID), ANI allows service providers to see the number of the calling party, but has the additional benefit of being resistant to caller ID blocking. Also, ANI can display the number of the calling party in real time. However, ANI is becoming increasingly unreliable because true caller IDs are easily disguised by fraudulent users who use an anonymizer or spoofing technology to hide their true originating point and phone numbers.

Some service providers have turned to alternative commercial products and solutions that rely on real-time telephone network forensics, telephony reference carrier call-routing databases, and proprietary analytics to confirm that the identity of the caller matches the actual phone number being used. However, a major limitation of these products and solutions is that it relies on customers calling in to a service provider, and does nothing to address situations where a service provider may need to quickly contact the user and confirm the legitimacy of a transaction or activity in progress.

Other solutions implement a myriad of voice biometrics for user authentication. Although it appears to be promising, there is a significant amount of "friction" that is added to the user experience in the form of initially training the solution to recognize a legitimate user's voice. Friction is commonly referred to the burden and inconvenience experienced by the user who is expected to go through an authentication process. Voice biometrics add a significant amount of friction because it requires active or passive enrollment from the user before it can reaches success rates that make it feasible for real-world use. In addition, since speech patterns vary worldwide, voice biometrics may not be practical option for service providers who conduct business internationally. Moreover, there are concerns about false positives and difficulties with voice detection that can increase costs and additional friction for the user.

It should be appreciated that there remains a need for a call center verification process that avoids the failures of current knowledge based authentication methods, eliminate the opportunity of social engineering, and reduce the failure rates of KBA methods which frustrate legitimate customers. The present invention addresses these need and others.

SUMMARY OF THE INVENTION

Briefly, and in general terms, the invention provides a service provider initiated identity verification system and method occurring during a service call with a service user. The invention overcomes the difficulties inherent in service provider interactions by introducing a second factor of authentication. Generally, authentication mechanisms fall into the categories of "something you know" (passwords, KBA), "something you are" (biometrics), and "something you have" (communication device, hard/soft token). Due to the vulnerabilities of relying on "something you know" in a live call scenario, and the additional friction and uncertainty in accuracy related to "something you are," the current invention relies on "something you have" in the form of a communication device capable of receiving text based message.

In various embodiments in accordance with the invention, the service provider initiated verification system verifies a user of a service through a process in which a user contacts or is contacted by a service provider at a call center, who then determines that a further verification of the user's identity is necessary. The service provider then initiates sending a verification code to the user, who is then asked to provide the code back to the service provider. The received code and the transmitted code are compared. If the verification codes match, the user is authenticated.

In an exemplary embodiment, a telephonic connection is established when the service user is contacted or calls into the call center of the service provider. During the ongoing service call, the service provider may request basic account information for authentication. Basic account information may include but is not limited to name, address, telephone number, date of birth, gender, and the like. If the service provider determines that a further verification of the user's identity is necessary, the service provider initiates sending a verification code via short message service (SMS) to the service user's SMS-enabled mobile device on record with the service user's account. The service user is then prompted to relay the code back to the service provider who then enters it into the system. If the received verification code matches the transmitted verification code, then the user is verified.

In another exemplary embodiment, the service provider may initiate the call center verification system to send the verification code via voice message to the service user's mobile device on record with the service user's account. The invention also contemplates providing a system telephone number for the service user to call to obtain the verification code.

In a detailed aspect of an exemplary embodiment, the call center verification system may be triggered for certain events that require a higher level of scrutiny, such as a user request to access or modify private account information or authorizing a transaction.

In yet another detailed aspect of an exemplary embodiment, the verification code is unknown to the service provider representative during the verification process, thus preventing any possibility of social engineering. When the verification code is relayed back to the service provider, it must be entered into the system to verify the service user because it is the system that compares the transmitted verification code and the received verification code and verifies the user if there is a match.

In yet another detailed aspect of an exemplary embodiment, the verification code may be relayed back by keypad entry. In this manner, the service user is directly authenticated by the system and the service provider representative is further removed from the authentication process, thereby reducing the possibility of social engineering.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

As shown in the accompanying drawings, for the purposes of illustration, the present invention resides in a process for verifying the identity of a service user during an ongoing service call by transmitting a verification code to the service user, who then must relay the verification code back to the service provider. It will be appreciated by those skilled in the art that the service call is typically established via a telephonic connection including communications through public switch telephone network (PSTN), satellite, Voice over Internet Protocol (VoIP), mobile networks, among others, as will be more fully described herein. It will also be appreciated by those skilled in the art that the verification code is sent via a Short Message Service (SMS) message or voice message, but may include other means of communication including, but not limited to, other types of text messaging, unstructured supplementary service data (USSD), instant message, email, and the like.

As used herein, the service user is one that is calling a call center of a service provider or is contacted by a service provider. Typically, the service user is a consumer or customer of the service provider, and has already set up an account and established an ongoing business relationship with the service provider. Accordingly, the service provider possesses general information of the service user including, among other things, basic account information and a contact number. The service provider is typically a one involved in the trade of goods, services, or both, having an established means of contacting or being contacted by a customer, such as a call center.

Figure 1:
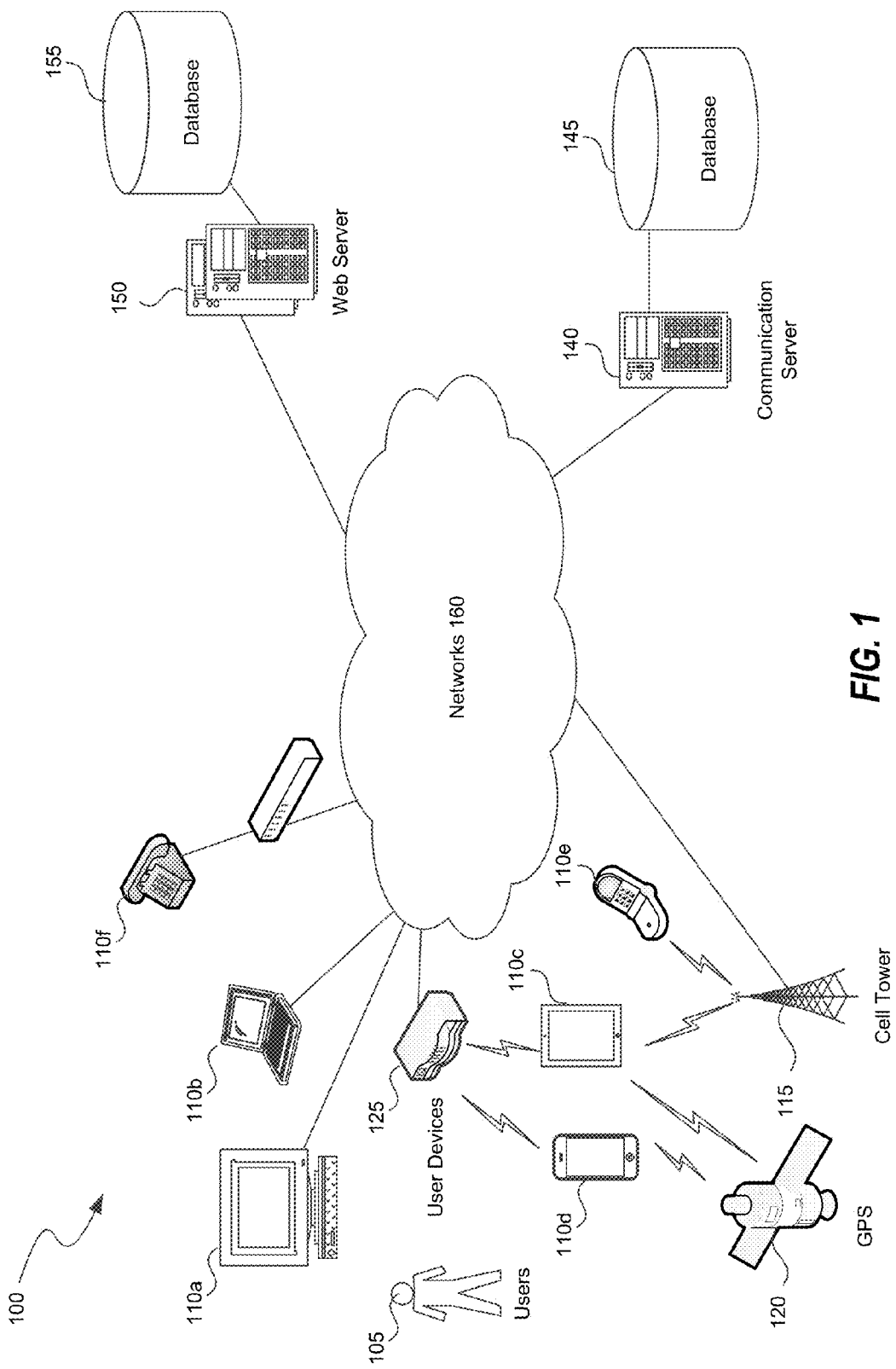
FIG. 1 is a diagram illustrating an exemplary environment in which a service call between a service user and service provider may be processed for verification.

The call center verification system may be implemented in a general computing environment 100, such as the one shown in FIG. 1. Although not required, aspects and implementations of the call center verification system will be described in context of computer-executable instructions, such as routines executed by a general purpose computer, a personal computer, a server, or other computing systems. Embodiments of the call center verification system may also be embodied in a special purpose computer or data processor that is specifically programmed, configured, or constructed to perform one or more of the computer-executable instructions disclosed herein. The terms "computer" and "computing device" generally refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

As illustrated in FIG. 1, user devices, such as desktop computer 110a, laptop computer 110b, tablet 110d, mobile device 110c, feature phone 110e, and the like, are used by users to access websites that are hosted by server computers, such as web server 150. A communication server 140 may connect to and communicate with each other across networks 160. Networks 160 may include wired and wireless, private networks and public networks (e.g., the Internet). Client devices 110a-110e use network interfaces to connect and/or communicate with networks 160, either directly, or via wireless routers 125, or cell towers 115. Network interfaces may employ connection protocols such as direct connect, Ethernet, wireless connection such as IEEE 802.11a-n, and the like to connect to networks 160. Some client devices such as devices 110c-110d may be configured with a Global Positioning System (GPS) or Assisted Global Positioning System (A-GPS) receiver to receive signals broadcast by GPS satellites 120. Some client devices such as devices 110c-110e may be equipped with transceiver circuitry to handle radio communications to wirelessly communicate with nearby cell towers or base stations 115 using wireless mobile telephone standards such as Global System for Mobile Communications (GSM), CDMA (Code Division Multiple Access), General Packet Radio Service (GPRS), and/or the like.

Embodiments of the call center verification system may also be implemented in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the call center verification system described herein may be stored or distributed on tangible, non-transitory computer-readable media, including magnetic and optically readable and removable computer discs, stored in firmware in chips (e.g., EEPROM chips), an array of devices (e.g., Redundant Array of Independent Disks (RAID)), solid state memory devices (e.g., solid state drives (SSD), Universal Serial Bus (USB)), and/or the like. Alternatively, aspects of the call center verification system may be distributed electronically over the Internet or over other networks (including wireless networks). In some embodiments, the call center verification system may in part reside on the web server 150 and/or the communication server 140. Database 145 and 155 contains data utilized by the call center verification system, and, in some implementations, software necessary to perform functions of the system. For example, database 145 and 155 may contain data associated with a service user, such as account information and a mobile communication number associated with the service user's mobile device.

Figure 2:
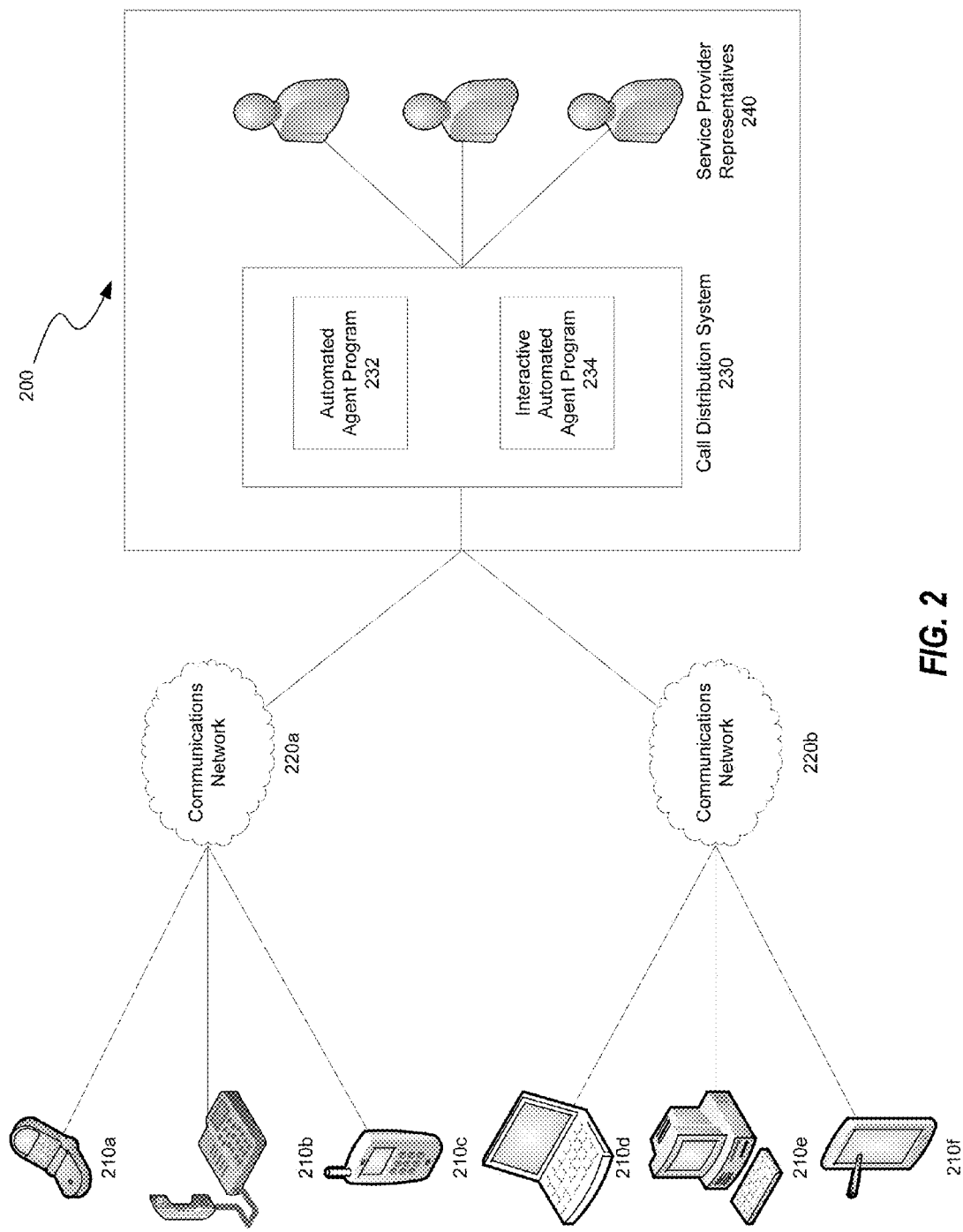
FIG. 2 is a block diagram illustrating an embodiment of a call center of a service provider.

FIG. 2 is an exemplary diagram of the call center verification system 200. Communication devices 210a-c are connected to a communications network 220a. By way of example, and not as a limitation, communication devices may be a wireless handset 210a, a conventional landline telephone 210b, an internet enabled smart phone 210c, and/or any other device that enables audio communication over dedicated network links. The communications network 220a may include the public switch telephone network (PSTN), an advanced intelligent network (AIN), a personal communications service (PCS) network, a code division multiple access (CDMA) network, a time division multiple access (TDMA) network, a global system mobile (GSM) network, a virtual private network (VPN) that provides secure and encrypted communications between nodes of a broader network, a wireless telephone network and/or any network or combination of networks that provide a medium for transmitting audio communications between a customer device and a service center and/or voice response system.

The call center verification system 200 may also include user computer devices 210d-f connecting to a communications network 220b. By a way of example, and not as a limitation, the user computer device may be a laptop computer 210d, a desktop computer 210e, a mobile web browser or tablet 210f, and/or any device with a processor or microprocessor that permits access to a communication network. The communications network 220b may include, for example, the public switched telephone network (PSTN), the internet, a satellite communications network, a broadband cable network, a local area network (LAN), a wide area network (WAN), and/or a wireless local area network (WiLAN), including any combination of networks that provide a medium for transmitting communications between a processor-based user device and a service center and/or voice response system.

Referring again to FIG. 2, an exemplary embodiment of the call center verification system 200 may include a call distribution component 230. The call distribution component 230 may function as an automated relay hub to direct calls to the next available service provider representative 240. Alternatively, the call distribution component 230 may include an automated agent program 232 executed by a processor and programmed to prompt and/or collect basic information from a service user before directing the call to a service provider representative. In another exemplary embodiment, the call distribution component 230 may include an interactive automated agent program 234 that is programmed to follow a script to collect information from a service user using speech recognition, language processing, and/or dual tone multi-frequency (DTMF) signals. Additionally, the program may also retrieve and provide information to a service provider based upon the information provided by the service user. In yet another exemplary embodiment, the program may retrieve and provide information to the service provider before a service call is directed to a service provider representative 240. FIG. 2 illustrates embodiments of a call center verification system and this invention is no way limited to any one embodiment such as the one in FIG. 2. It will be appreciated by those of ordinary skill in the art that for illustrative purposes, an embodiment of a call center verification system as shown in the figures; however, any type of representation thereof may be utilized within the contemplation of this invention with no one in particular being required to practice this invention.

Figure 3:
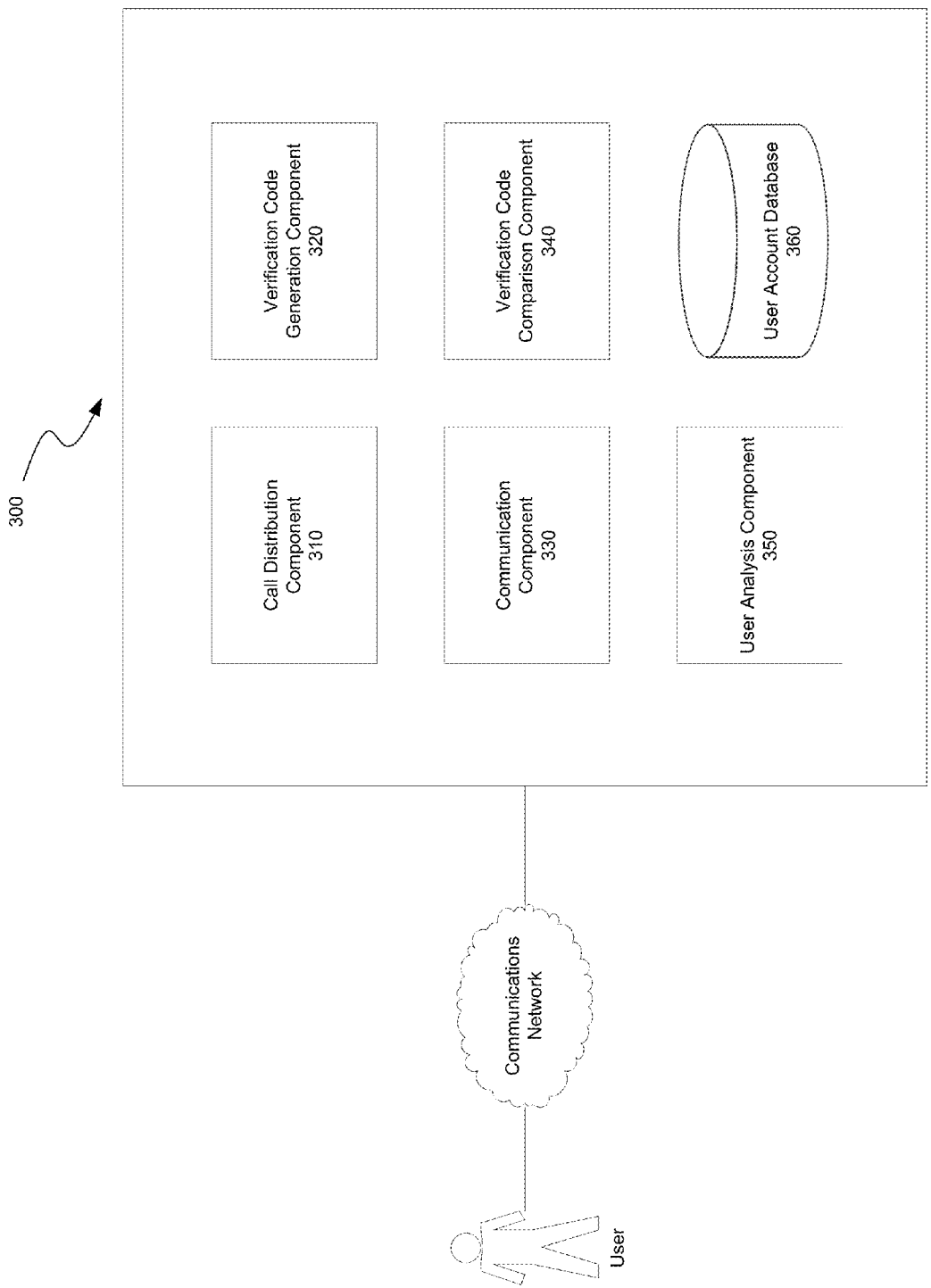
FIG. 3 is a block diagram illustrating an exemplary embodiment of the call center verification system.

FIG. 3 is a block diagram of various modules of a call center verification system 300. The call center verification system 300 directs service calls, sends and receives verification messages, receives user data, among other things. The call center verification system 300 includes a call distribution component 310, a verification code generation component 320, a communication component 330, a verification code comparison component 340, and a user analysis component 350. The call center verification system accesses and/or stores data in a user account database 360.

As discussed above in FIG. 2, the call distribution component 310 directs service calls between a service user and a service provider representative. The verification code generation component 320 generates or identifies a verification code to be transmitted to a service user. It may generate a verification code using a random number generator or an algorithm for generating verification codes. The verification code generation component 320 may also identify a stored verification code that is to be sent to a service user. Typically, the verification code is short and easy to remember. It may be numeric or alphanumeric. In an exemplary embodiment, the verification code is an SMS message or a voice message.

The communication component 330 transmits and receives verification codes and user data. It may transmit and receive verification codes from service users and third parties, such as websites. The communication component 330 may be configured to retrieve user data from the user account database 360 and receive data submitted by a service user. It may also transmit web or application data to a third party or a user. User data may include contact information for a service user, such as a mobile device number, account number, a username, an email address, date of birth, and the like.

The verification code comparison component 340 compares transmitted and received verification codes. For example, the verification code comparison component may compare a verification code transmitted by a service provider to a service user with a verification code relayed back from the service user to the service provider during a service call. The verification code comparison component 340 is configured to determine whether a transmitted verification code matches a received verification code. Alternatively, it may be configured to determine whether the codes substantially match. For example, a transmitted verification code consisting of an alphanumeric string may be determined to substantially match a received verification code if the received verification code includes a majority of the characters of the transmitted alphanumeric string.

The user analysis component 350 is configured to analyze user data and verification codes received from a user or a third party or identified in the user account database 360 to identify the information associated with a service user. For example, the user analysis component 350 may receive account information from a service user get preliminary access the service user's account, prior to verification. In another example, it may gather data from the user account database 360 to identify a phone number associated with a service user to send a verification code.

Figure 4:
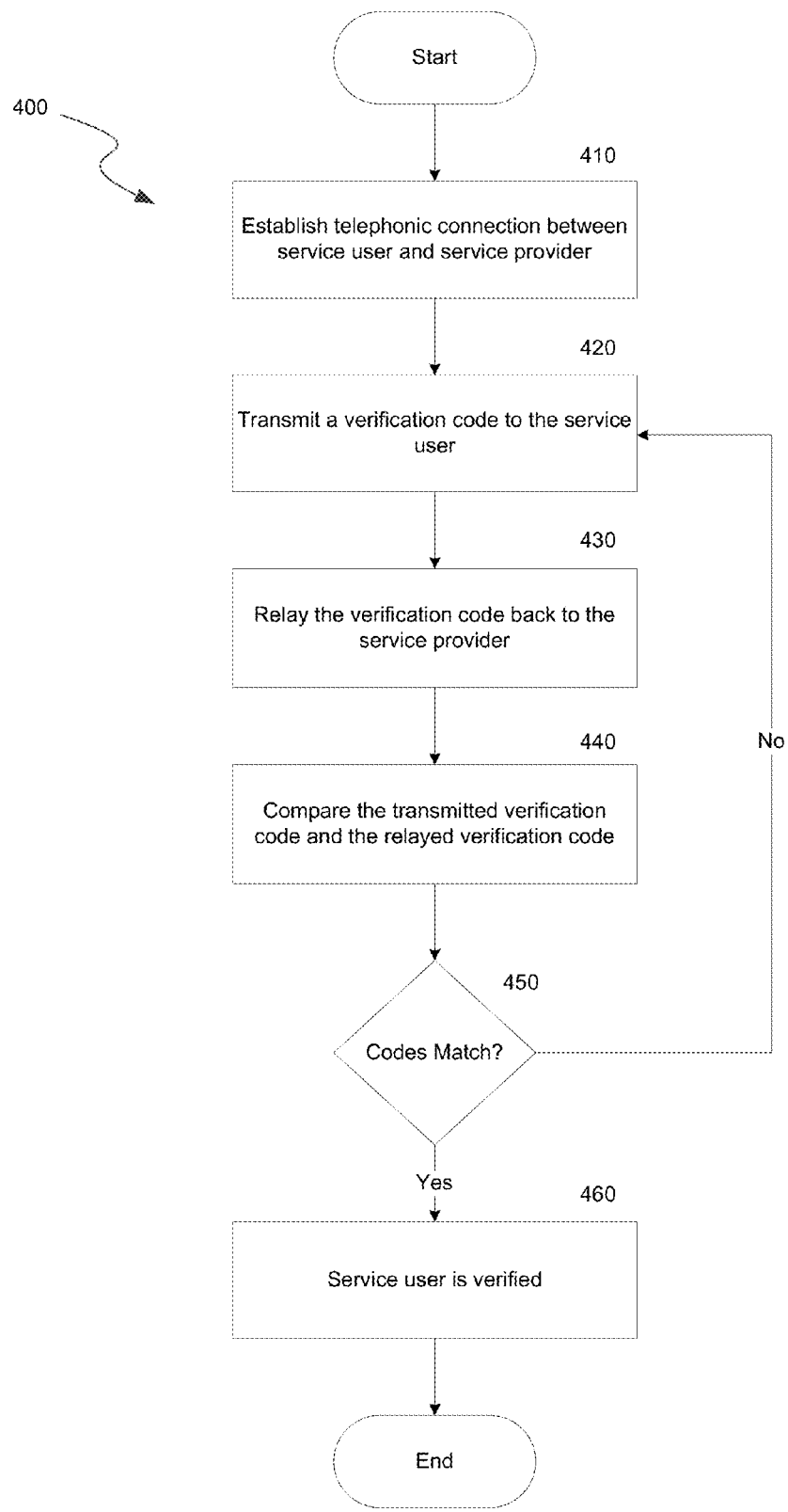
FIG. 4 is a logic flow diagram illustrating an embodiment of the verification system during an ongoing service call between a service user and a service provider.

FIG. 4 is a logic flow diagram illustrating the verification system during an ongoing service call between service user and a service provider. The method 400 starts at block 410 when a telephonic connection between the service user and the service provider is first established when either the service user calls a call center of the service provider or when a service provider calls a service user. To verify the caller, at block 420, a verification code is sent to the service user. At block 430, the service user relays the verification code back to the service provider during the ongoing service call. At block 440, the verification code that was transmitted to the service user and the verification code that was relayed back to the service provider are compared to determine if the codes match. If both the transmitted verification code and the relayed verification codes match at decision block 450, the system considers the user to be verified and ends at block 460. If there is no match at decision block 440, the system may retransmit another verification code, at block 420.

In an exemplary embodiment, the service user's device may both establish a telephonic connection with the service provider and be capable of receiving a verification code. For example, the service user may use a SMS-enabled mobile device to establish a telephonic connection with the service provider. The service provider may transmit a verification code to the service user's same SMS-enabled device during the ongoing service call. Alternatively, the service user may have a primary device for establishing a telephonic connection and a secondary device to receive the verification code. For example, the service user may establish a telephonic connection with the service provider via a landline phone, the service user's primary device. During the ongoing service call on the primary device, the service provider may transmit a verification code to the user's secondary SMS-enabled mobile device.

Figure 5:
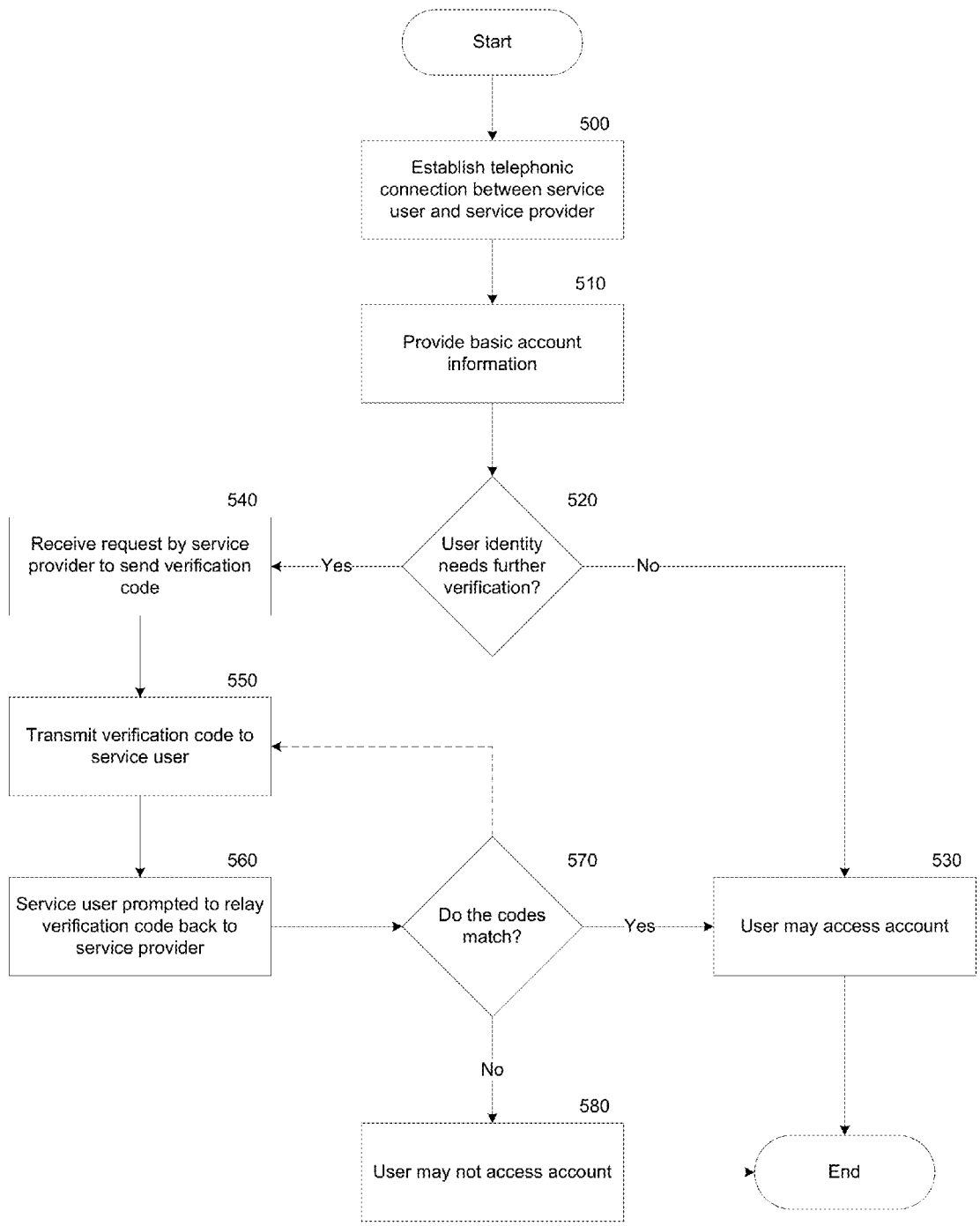
FIG. 5 is a logic flow diagram illustrating an embodiment of the verification system, wherein the service provider may determine whether further verification is needed.

In a preferred embodiment, as illustrated in FIG. 5, the service provider is provided an opportunity to determine whether to further verify the service user. At block 500, a telephonic connection is first established between the service user and the service provider when either the service user calls a call center of the service provider or when a service provider calls a service user. At block 510, the service user is prompted to provide identifying information to verify that the service user is who he or she represents themselves to be. The information required to be provided may include name, address, email address, social security number, service account number, and the like. Based on the type of inquiry and information provided, at decision block 520, the service provider representative may then elect whether to further verify the service user. Alternatively, in some circumstances, the system will automatically require the user to be verified. If the information provided by the service user adequately verifies the service user's identity and does not need further verification, then the service provider may proceed to access the service user account, at block 530. However, if the information provided by the service user is inadequate or incomplete, then the service provider may prompt the system to send a verification code to the service user, at block 540.

It will be appreciated by those of ordinary skill in the art that the additional layer of security and verification may depend upon a variety of facts and circumstances including purpose of call, type of inquiry, type of information provided, and quantity of information provided, among others. For example, a service user calling to inquire about publicly available information or information that is widely distributed to the public on an unrestricted basis, such as the service provider's hours of operation, may only be required to provide basic information such as address or zip code, and not require additional verification. In contrast, a service user calling a service provider to access, alter, or modify nonpublic personal information or any personally identifiable financial information may be required to provide confidential account information, as well as require further verification during the ongoing service call to ensure that the service user is who he or she purports to be. Furthermore, the service provider representative may require further verification in situations where even though the provided information was be accurate and complete, the interaction, circumstance, or conduct of the caller suggests it might be fraudulent.

Alternatively, in some embodiments, the system may prevent social engineering by eliminating the service provider representative from the verification process. After the service user provides the request account information, the service provider representative may enter the information into the system. The system then determines whether the service user needs further verification, at decision block 520. If the system determine that the service user is adequately verified, it will allow the service provider representative access to the service user's account. However, if the system determines that the service user requires further verification, a verification code will be transmitted to the service user.

Referring again to FIG. 5, during an ongoing service call, if a service user needs further verification, a verification code is transmitted to the service user, at block 550. The service user is prompted to relay the verification code back to the service provider, at block 560. At decision block 570, the code that is transmitted to the service user and the code that is relayed back to the service provider representative are compared. If the transmitted code matches the relayed code, the service user is verified and the service user's account may be accessed, at block 530. If the transmitted code does not match the relayed code, the service user may not access the account. In a preferred embodiment, if the codes do not match at decision block 570, the system may allow a limited number times to retransmit a verification code.

In some embodiments, at block 570, a service provider representative may compare the transmitted verification code and the relayed verification code to determine whether the codes match. Alternatively, to prevent social engineering, the transmitted verification code may unknown to the service provider representative. When the service user relays the verification code back to the service provider representative, the service provider representative must enter the relayed verification code into the system. The system then compares the transmitted verification code and the relayed verification code. If the codes match, the service user may access the account. However, if the codes do not match, then the service user may not access the account and will be prompted to retransmit a verification code to the service provider.

Figure 6:
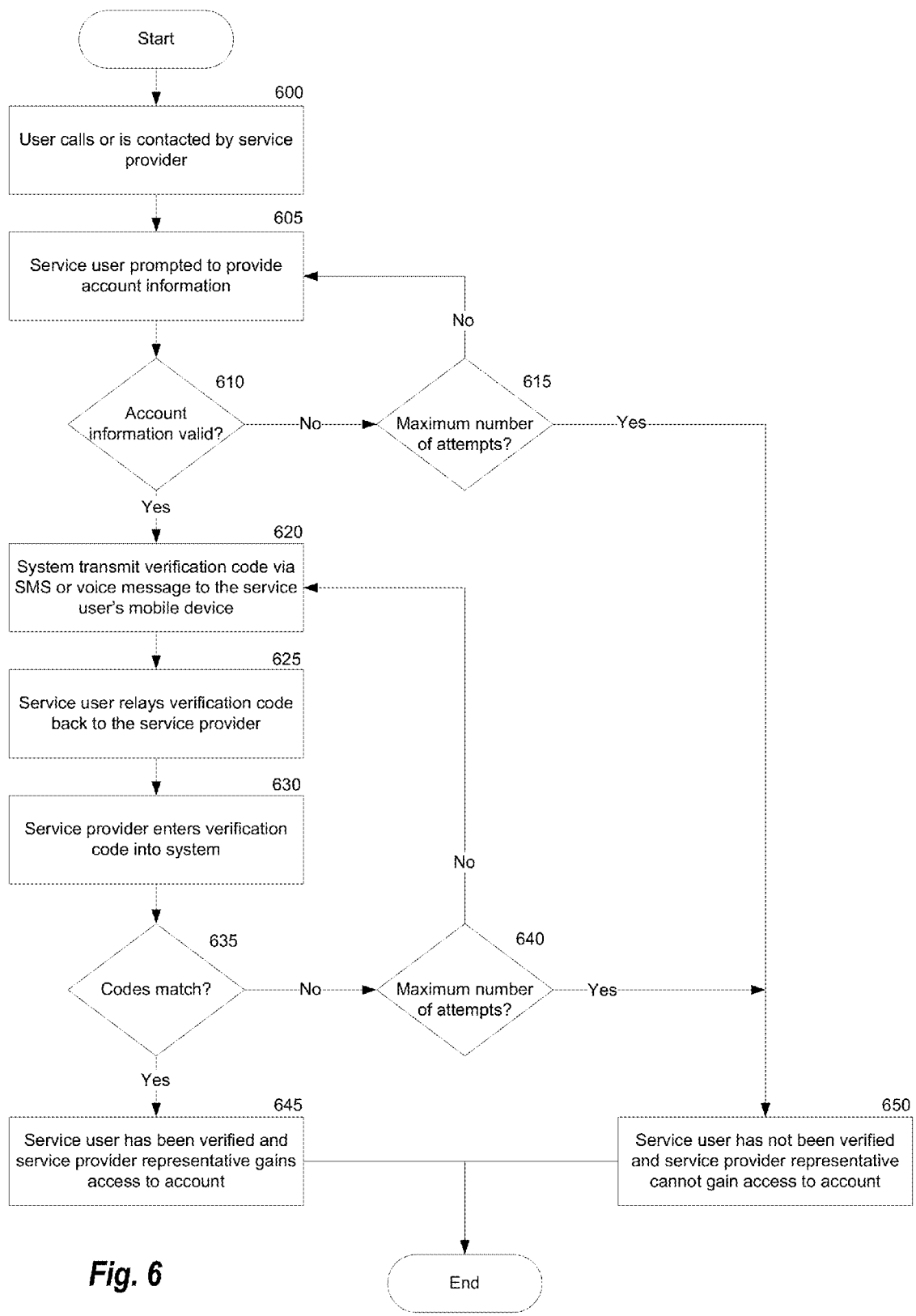
FIG. 6 is a logic flow diagram illustrating an embodiment of the verification system, wherein the verification process is determined by the system.

FIG. 6 is an exemplary flowchart illustrating another embodiment of the invention, wherein the possibility of social engineering is eliminated by removing the service provider representative from the verification process. Not only is the service provider representative removed from the verification process, the service provider representative cannot access the service user's account unless the service user has been verified by the system. FIG. 6 illustrates one embodiment of such a flowchart and the invention is in no way limited to any one embodiment such as the one shown in FIG. 6. A telephonic connection is established when a user calls or is contacted by a service provider at block 600. During the ongoing service call, the service user provides basic account information for the first stage of verification, at block 605. As discussed previously, basic account information submitted by the service user may include, but is not limited to, name, address, account number, date of birth, social security number, email, login name, answers to security questions, and the like. At decision block 610, after the service provider representative enters the account information into the system, the system determines whether the account information is valid. If the account information is invalid, at block 615, the system may allow a limited number of attempts to access the account. If the maximum number of attempt has been reached, then the service user is not verified and the service provider representative cannot access the account, at block 650.

If the account information is valid, the system transmits a verification code to the service user's mobile device for the second stage of verification, at block 620. The transmitted verification code is not disclosed to the service provider representative and is sent directly to the service user by the system. The verification code may be transmitted as a SMS or voice message. For example, the service provider may establish a telephonic connection with the service user via a SMS-enabled mobile device. Then, a SMS verification code is sent to the service user's mobile device, allowing the service user to simultaneously check the verification during the ongoing call. Alternatively, if the verification code is sent as a voice message, the service user may place the service provider on hold, check the voice message on the other line, and then switch back.

Referring again to FIG. 6, after the verification code has been sent to the service user's mobile device, the service user then relays the verification code back to the service provider representative during the ongoing service call, at block 625. To compare the transmitted verification code and the relayed verification code, the service provider enters the code into the system, at block 635. Consequently, any possibility of social engineering is eliminated since the system, not the service provider representative, compares the codes. Because the transmitted verification code was not disclosed to the service provider representative, as discussed above, there is no possibility for the service provider representative to override or bypass the verification process. At decision block 635, the system determines whether the transmitted verification code and the relayed verification code match. If the codes match, the service user is verified and the service provider representative is granted access to the account, at block 645. If the codes do not match, then the system attempts to retransmit another verification code unless it has reached the maximum number of attempts, at decision block 640. If the maximum number of attempts has been reached, the service user has not been verified and the service provider representative will not be granted access to the service user's account, ending at block 650.

It should be appreciated from the foregoing that the present invention provides variations of elements, steps and system which may be used, all within the scope of this invention. Although the invention has been disclosed in detail with reference only to the exemplary embodiments, those skilled in the art will appreciate that various other embodiments can be provided without departing from the scope of the invention. Accordingly, the invention is defined only by the claims set forth below.

What is claimed is:

1. A method for verifying the identity of a service user during a service call and to provide a service provider representative access to the service user's account, the method comprising:
    establishing a telephonic connection between the service user and the service provider representative;
    receiving, from the service user, information entered by the service provider representative via a service provider computing system, the received information including account information associated with the service user;
    transmitting, to the service user, a transmitted verification code if the received information matches the service user's account;
    receiving a received verification code from the service user to the service provider;
    submitting the received verification code into the service provider computing system;
    comparing the transmitted verification code and the received verification code;
    verifying the service user when the transmitted verification code matches the received verification code; and
    providing the service provider representative access to the service user's account.

2. The method of claim 1, wherein the telephonic connection is established when the service user is contacted by or is calling the service provider representative via a user communication device.

3. The method of claim 2, wherein the user communication device is the service user's telephone or short message service (SMS) enabled device.

4. The method of claim 1, wherein the transmitted verification code is via a SMS or voice message.

5. The method of claim 4, wherein the transmitted verification code is transmitted to the user communication device.

6. The method of claim 4, wherein the transmitted verification code is transmitted to a secondary user device.

7. The method of claim 6, wherein the secondary user device is the service user's telephone or SMS-enabled device.

8. The method of claim 4, wherein the voice message comprises an automated message that includes the transmitted verification code.

9. The method of claim 1, wherein the received verification code is received by the service provider representative via keypad.

10. A system for verifying the identity of a service user that is contacted or calls into a service provider and providing a service provider representative access to a service user's account, the verification performed during an ongoing service call with the service provider representative, the computing system comprising:
  a memory storing computer-executable instructions;
  a processor in communication with the memory and configured to process the computer-executable instructions to:
    establishing a telephonic connection between the service user and the service provider representative;
    receive information entered by the service provider representative, the received information including account information associated with the service user;
    retrieve information associated with the service user;
    determine whether the received information matches the retrieved information;
    generate a verification code if the information match;
    transmit, to the service user, the verification code to the service user's communication device;
    receive the verification code;
    determine whether the transmitted verification code and the received verification code match; and
    provide the service provider representative access to the service user's account if the codes match.

11. The system of claim 10, further including a call distribution component configured to direct calls between the service user and the service provider representative.

12. The system of claim 11, wherein the call distribution component is further configured to receive account information to establish the identity of the service user before being directed to a service provider representative.

13. The system of claim 10, wherein the communication component is further configured to receive account information submitted by the service provider via a computing device.

14. The system of claim 10, wherein the communication component is further configured to transmit the transmitted verification code via SMS message or voice message to the user communication device.

15. The system of claim 10, wherein the communication component is further configured to receive the received verification code by telephone using voice or keypad entry.

16. The system of claim 10, wherein the user analysis component is further configured to identify a user account associated with the user communication device from which the received verification code is received.

17. A method for verifying the identity of a service user during an ongoing service call and to provide a service provider representative access to the service user's account, the method executed by a computing system that verifies the service user, the method comprising:
  establishing a telephonic connection between the service user and the service provider representative;
  performing a first stage of verification, wherein the first stage of verification includes:
    receiving, from the service user, a received plurality of information associated with a service user's account;
    submitting, to a service provider computing system, the received plurality of information by the service provider representative; and
    comparing, by the service provider computing system, the received plurality of information with the service user's account;
  performing a second stage of verification only if the received plurality of information matches the service user' account, wherein the second stage of verification includes:
    retrieving a contact number of a user communication device associated with the service user by the computing system;
    transmitting, to the contact number of the user communication device associated with the service user, a transmitted verification code;
    receiving, by the service user communication device, a received verification code;
    submitting the received verification code to the service provider computing system via the service user communication device;
    comparing the transmitted verification code and the received verification code by the service provider computing system;
    verifying the service user when the transmitted verification code matches the received verification code; and
    granting or denying the service provider representative access to the service user's account based on whether the codes match.

18. The method of claim 17, wherein the telephonic connection is established when the service user is contacted by or is calling the service provider via the user communication device.

19. The method of claim 18, wherein the user communication device is a telephone or SMS-enabled device.

20. The method of claim 17, wherein a plurality of information includes name, account number, date of birth, and social security number.

21. The method of claim 17, wherein a plurality of information further includes user name, email address, and predetermined security questions.

22. The method of claim 17, wherein the transmitted verification code comprises a SMS message, voice message, unstructured supplementary service data (USSD), or phone application message or notification.

23. The method of claim 22, wherein the transmitted verification code is transmitted to the user communication device.

24. The method of claim 23, wherein the transmitted verification code is transmitted to a secondary user device.

25. The method of claim 24, wherein the secondary user device is a telephone or SMS-enabled device.

26. The method of claim 22, wherein the voice message comprises an automated message that includes the transmitted verification code.

27. The method of claim 17, wherein the received verification code is received by the service provider via keypad.

\* \* \* \* \*